Sept. 19, 1967     C. L. MEEHAN     3,342,237
ATTACHABLE FASTENER DEVICE
Filed Oct. 23, 1965
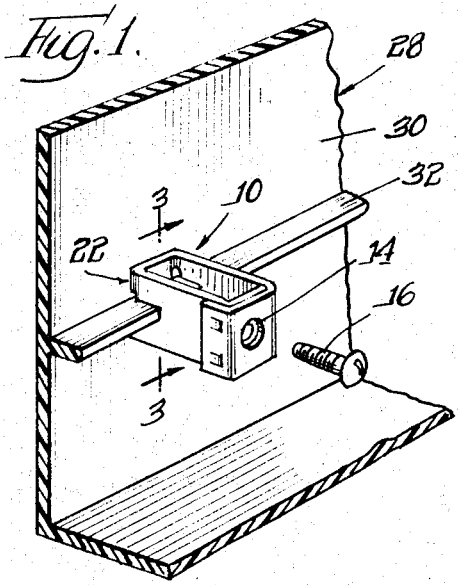
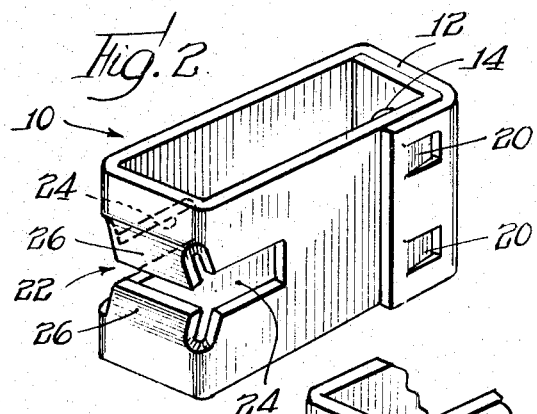
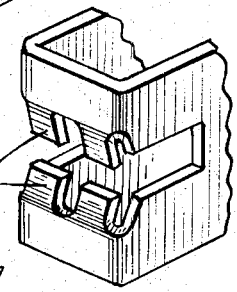
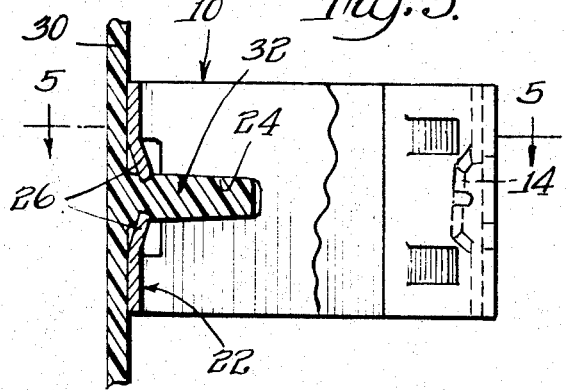
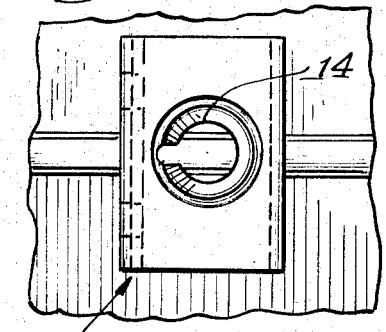
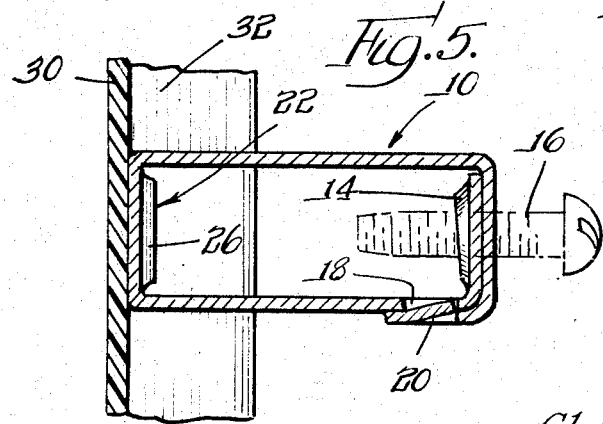
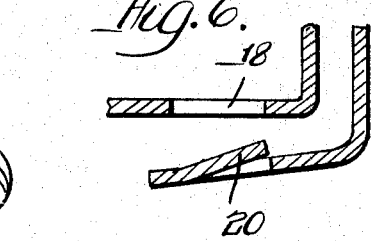
Inventor
Clarence L. Meehan
By: Olson, Trexler, Wolters & Bushnell
attys.

United States Patent Office 3,342,237
Patented Sept. 19, 1967

3,342,237
ATTACHABLE FASTENER DEVICE
Clarence L. Meehan, Itasca, Ill., assignor to Illinois Tool Works, Inc., Chicago, Ill., a corporation of Delaware
Filed Oct. 23, 1965, Ser. No. 502,915
3 Claims. (Cl. 151—41.75)

ABSTRACT OF THE DISCLOSURE

Fastening device for permitting parts to be mounted to a protuberance such as a strengthening rib on the inside of a cabinet. The fastening device includes a struck out portion at one end thereof which permits the device to be pressed into locking engagement with a rib-like member but prevents its removal therefrom. The opposite end of the fastening device includes a pair of bent, overlapping portions having aligned openings therein for receiving a fastener shank.

---

This invention relates generally to fastener devices and more particularly to fastener devices of the type which are adapted to be mounted upon longitudinal or rib-like protuberances.

There are numerous places, as for example the interior of a television or radio cabinet, where the use of conventional fastening devices, such as screws and the like, are not practical for mounting parts upon the interior walls of the cabinet. For instance, panels bearing printed circuits are in common use today and are often located adjacent the interior wall of the television or radio cabinet. The present invention contemplates the provision of means whereby parts such as the aforesaid printed circuit panels, etc., may be mounted upon a cabinet wall without the use of conventional screws and bolts. It is not uncommon to provide cabinets or receptacles of the type referred to above with strengthening ribs along the interior of the walls thereof. It is therefore one of the important objects of the present invention to provide a screw accommodating device which may be mounted with ease upon a longitudinal protuberance or rib.

It is a further object of the present invention to provide a fastener device as set forth above which may be secured to a longitudinal protuberance or rib without the necessity of providing screws or other auxiliary fastening means. To this end the present invention contemplates the provision of a fastener device which may be pressed onto a rib in order to establish a firm, permanent connection or mounting.

Another object of the present invention is to provide an improved fastener device mountable upon a longitudinal protuberance or rib and adapted to accommodate a fastener shank for securing a part such as a panel adjacent a wall of a cabinet.

A further object of the present invention is to provide a fastener device of the above-mentioned type which may be economically produced from a single piece of sheet metal stock by practicing conventional stamping and forming methods.

The foregoing and other objects and advantages will be more apparent from the following detailed description when considered in connection with the accompanying drawing, wherein:

FIG. 1 is a fragmentary perspective view of a workpiece or cabinet with a fastener device of the present invention mounted upon a longitudinal rib projecting from a wall of the cabinet;

FIG. 2 is an enlarged perspective view of the fastening device shown in FIG. 1;

FIG. 3 is a view taken substantially along the line 3—3 of FIG. 1, with a portion of the wall of the fastening device broken away more clearly to illustrate the arrangement of the rib engaging and locking fingers;

FIG. 4 is an end elevational view taken from the right of FIG. 3;

FIG. 5 is a horizontal sectional view taken substantially along the line 5—5 of FIG. 3;

FIG. 6 is a fragmentary sectional view of the interlocking extremities of the sheet metal strip or stamping to illustrate the manner in which struck-out portions in one extremity interlock with complementary apertures in the other extremity; and FIG. 7 is a fragmentary perspective view of the rib engaging portion of an attaching device of modified form contemplated by the present invention.

Referring now to the drawing more in detail wherein like numerals have been employed to designate similar parts throughout the various figures, it will be noted that a fastener device designated generally by the numeral 10 is representative of one embodiment of the present invention. The device 10 consists of a single strip of sheet metal stock formed into a hollow rectangular shape as viewed from the top. The extremities of the sheet metal strip are bent into overlapping or superimposing relationship so as to provide a double fastener accommodating wall 12 at one extremity. The central area of the double wall 12 is formed with a helical impression 14 for receiving a fastener shank, such as the shank of a screw member 16 illustrated in FIGS. 1 and 5. The overlapping extremities of the sheet metal strip are secured against separation through the agency of a suitable tear drop shear arrangement shown in detail in FIG. 6. A pair of spaced apertures 18 are adapted to interlock with complementary struck-out fingers 20 to secure the overlapping extremities of the sheet metal strip against unauthorized separation.

Oppositely disposed from the shank accommodating portion of the fastener device 10 is a rib accommodating end designated generally by the numeral 22. This end portion 22 is bifurcated by a pair of longitudinal recesses 24, FIG. 2. At the entrance of the slots or recesses 24 is a pair of resilient work-impinging fingers 26. The width of the slots 24 and the distance between the free extremities of the fingers 26 are determined by the thickness of the rib or protuberance to which the device 10 is to be applied. Also, the longitudinal extent or depth of the recesses 24 may be determined by the structural characteristics of the protuberance or rib to which the device is to be fastened.

FIG. 1 fragmentarily discloses a cabinet or receptacle designated generally by the numeral 28. A vertical wall 30 of this cabinet is formed with a longitudinally extending rib or protuberance 32 to which the anchoring device 10 has been applied. The device 10 is applied by pressing the device laterally of the rib so that the resilient fingers 26 impinge opposite sides of the protuberance 32, as clearly illustrated in FIG. 3. It will also be seen in FIG. 3 that the protuberance 32 is received snugly within the longitudinal recesses 24. While the resilient locking teeth 26 permit association of the device 10 laterally of the rib in one direction, namely to the left of FIG. 3, the locking prongs or teeth 26 function aggressively to resist unauthorized shifting of the device 10 in the opposite direction.

With one or more of the devices 10 mounted on protuberances within the cabinet 28, the screw accommodating extremity, namely the double wall extremity 12 of each fastener device 10, is in a position to receive the shank 16 of the screw member shown in the drawing. Parts to be mounted in the cabinet may be secured in position against the double wall extremity 12 of each of the devices 10 by such screws or other suitable fastening elements. As previously mentioned, television and radio cabinets often require the parts such as printed circuit panels to be mounted adjacent the inner surface of a wall of the cabinet. The fastener or mounting device 10 previously described may be applied to ribs or protuberances of metallic and nonmetallic materials with equal facility and effectiveness.

FIG. 7 discloses a slightly modified form of rib accommodating extremity. The structure disclosed in FIG. 7 distinguishes from the device as illustrated in FIG. 2 only in the provision of four rib engaging and locking teeth 26a. In certain applications, it may be advantageous to employ the multiple locking tooth arrangement shown in FIG. 7.

From the foregoing, it will be apparent that the present invention contemplates a mounting or fastener device which may be very conveniently and easily secured to a protuberance without the necessity of employing any auxiliary fastener elements such as screws, rivets and the like. By simply pressing the sheet metal anchoring or fastener device 10 in a direction laterally of the rib or protuberance until the protuberance is fully and snugly positioned within the bifurcating recesses, a firm connection is established between the parts and the resilient locking teeth function effectively to counteract unauthorized separation of the parts. The hollow nature of the fastener device permits its telescopic association with and attachment to vertical frame members.

While for purposes of illustration the invention has been described in connection with cabinets and the like, it will be apparent from the foregoing description that a device constructed in accordance with the teachings of the present invention may be employed in a wide variety of applications. Obviously the invention contemplates modifications and changes without departing from the spirit and scope of the appended claims.

The invention is claimed as follows:

1. An attachable fastener device for attaching a fastener shank relative to a rib shaped protuberance on a wall comprising a longitudinal body member having a bifurcated portion at one end slideable over a rib, first integral locking means formed on at least one side of said bifurcated portion, said first locking means being formed at an angle relative to the rib so as to be slideable over the rib when moved in one direction and movable into wedging engagement with the rib to resist movement in the opposite direction, said fastener device having a pair of openings formed therein at points disposed from the bifurcated end portion, said openings having their edges peripherally continuous and aligned in face to face relationship and at least one of said openings being provided with an impression for accommodating and retaining the shank of a fastener, and second locking means formed adjacent said openings for retaining said openings in face to face relation.

2. An attachable fastener device as set forth in claim 1, wherein said device is formed from a single strip of sheet metal stock bent in a hollow polygonal form, the opposite extremities of the strip of sheet metal stock being provided with interlocking means to prevent unauthorized separation of the stock.

3. An attachable fastener device as set forth in claim 2 wherein at least one of the aligned openings has its edges formed in a helix to accommodate a screw fastener.

References Cited

UNITED STATES PATENTS

| 2,414,986 | 1/1947 | Tinnerman | 24—73 |
| 2,609,418 | 9/1952 | Binns et al. | 151—41.75 |
| 2,845,154 | 7/1958 | Duffield | 85—36 |
| 3,182,367 | 5/1965 | Hamann | 85—36 |
| 3,261,357 | 7/1966 | Roberts et al. | 85—36 |

FOREIGN PATENTS

| 479,568 | 12/1951 | Canada. |
| 817,489 | 7/1959 | Great Britain. |
| 998,469 | 7/1965 | Great Britain. |

CARL W. TOMLIN, *Primary Examiner.*

M. PARSONS, JR., *Examiner.*